United States Patent [19]
Ohtawara et al.

[11] Patent Number: 4,856,051
[45] Date of Patent: Aug. 8, 1989

[54] AUTOMATIC TELEPHONE ANSWERING APPARATUS

[75] Inventors: Isao Ohtawara, Ohra; Satoshi Ohgochi, Ohta, both of Japan

[73] Assignee: Sanyo Electric Co., Ltd., Japan

[21] Appl. No.: 60,108

[22] Filed: Jun. 9, 1987

[30] Foreign Application Priority Data

Jun. 10, 1986 [JP] Japan .................................. 61-134211
Jun. 10, 1986 [JP] Japan .................................. 61-134212
Jun. 10, 1986 [JP] Japan .................................. 61-134213
Jun. 11, 1986 [JP] Japan .................................. 61-135430
Jun. 12, 1986 [JP] Japan .................................. 61-136829

[51] Int. Cl.$^4$ ........................................... H04M 1/64
[52] U.S. Cl. ........................................ 379/88; 379/67
[58] Field of Search ............................. 379/67, 88, 89

[56] References Cited

U.S. PATENT DOCUMENTS 4,518,827 5/1985 Sagara .................................... 379/88
4,616,110 10/1986 Hashimoto ............................ 379/88

FOREIGN PATENT DOCUMENTS 2536612 5/1984 France ................................... 379/88
2098428 11/1982 United Kingdom ................. 379/88

Primary Examiner—Thomas W. Brown
Attorney, Agent, or Firm—Darby & Darby

[57] ABSTRACT

An automatic telephone answering apparatus having a plurality of incoming message memory circuits for successively storing an incoming message as the incoming message is received and having a control circuit for erasing the incoming message stored on the plurality of incoming message memory circuits after a predetermined period of silence has passed.

9 Claims, 3 Drawing Sheets

AUTOMATIC TELEPHONE ANSWERING APPARATUS

BACKGROUND OF THE INVENTION

1. Field of the Invention

The present invention relates to an automatic telephone answering apparatus which is arranged to automatically answer a call in the absence of its receiver, send out a message to a caller and, at the same time, memorize a message from the caller.

2. Description of the Prior Art

Such an automatic telephone answering apparatus has been a recent trend that is adapted to record a message from a caller on a recording tape after having sent out a response message recorded on an answering tape to the caller. It is disadvantageous, however, that the more complicated the structure of the apparatus of the type referred to above which employs a magnetic tape such as the recording tape or the answering tape becomes, the larger the apparatus is in size. For solving the above-described disadvantage, there is disclosed an automatic telephone answering apparatus utilizing semiconductor memories in order to answer and record the message, for example, in Japanese Patent Laid-Open Publication (unexamined) No. 60-21660 corresponding to U.S. Pat. No. 4,616,110.

The automatic telephone answering apparatus disclosed in the above Laid-Open Publication No. 60-21660 is provided with a plurality of message memory circuits, such that each call is arranged to be recorded in each message memory circuit every time the call is received. However, since the memory circuit is costly, it cannot be actually provided by a large number. Nevertheless, even when the message memory circuit is brought into the condition for recording a message from the caller after the caller hears the recorded outgoing message, but, without any message transmitted thereto after all, the message memory circuit which is in the recording condition is dealt with as if it were recorded. Therefore, when a next call is received, another message memory circuit is operated. Thus, in the prior art, the message memory circuits cannot be used to the utmost of their usefulness, resulting in decrease of the number of the messages which can be stored in the memory circuits.

SUMMARY OF THE INVENTION

Accordingly, an essential object of the present invention is to provide an improved automatic telephone answering apparatus in which it is so arranged that a memory in a message memory circuit for an incoming message which is in condition ready for recording the message is erased after a predetermined time of silence passed since the apparatus is brought into the message memory mode, thereby to again use the message memory circuit when a next call is received, resulting in effective use of the message memory circuits.

In accomplishing the above-described object, according to the present invention, the automatic telephone answering apparatus is comprised of a memory circuit for an outgoing message in which the outgoing message to be sent out to a caller is stored in the form of digital signals which will be read out from the memory circuit in the call receiving mode, a plurality of memory circuits for incoming messages each provided in correspondence to every one call for storing the message from the caller in digital signals when the apparatus is in the automatic answering mode, and a voice detection circuit which detects a voice of the caller.

If a voice signal from the caller is not detected in a predetermined time after the apparatus is brought in the message storing mode, the memory in one memory circuit which is in the message storing mode is erased. Then, when a next call is received, the one memory circuit in the storing mode is actuated again to memorize a message of the next call, if any.

The automatic telephone answering apparatus of the present invention further includes a call recording switch to be operated during the conversation with the caller.

Accordingly, the message recording for a long time is made possible in the automatic telephone answering apparatus of the present invention when the memory circuits for incoming messages are employed in plural numbers in the call recording mode.

Moreover, the automatic telephone answering apparatus is provided with a reproducing switch which is manipulated when the message memorized in the memory circuit for an incoming message is desired to be reproduced. Every time the reproducing switch is manipulated, the memory circuits are switched one after another so as to read out the messages stored therein.

A control circuit is also built in the automatic telephone answering apparatus of the present invention, by which the memory circuits for incoming messages are rendered continuously operable in plural numbers in the call recording mode through switching of the call recording switch. As a result, not only the recording duration can be elongated, but all of the call signals stored in the memory circuits for incoming messages through the call recording operation in the call recording mode in the automatic answering state are erased.

A display circuit of the automatic telephone answering apparatus is comprised of a recording switch which is operated when an outgoing message is to be stored in a message memory circuit, a control circuit which brings the message memory circuit into the write-in operation mode through switching of the recording switch and a light emitting element which becomes operable when the message memory circuit is in the write-in operation mode and which changes its display mode when the storable capacity of the message memory circuit is decreased. Accordingly, when the memory capacity of the message memory circuit is reduced, it can be recognized by the change of the display mode of the light emitting element.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
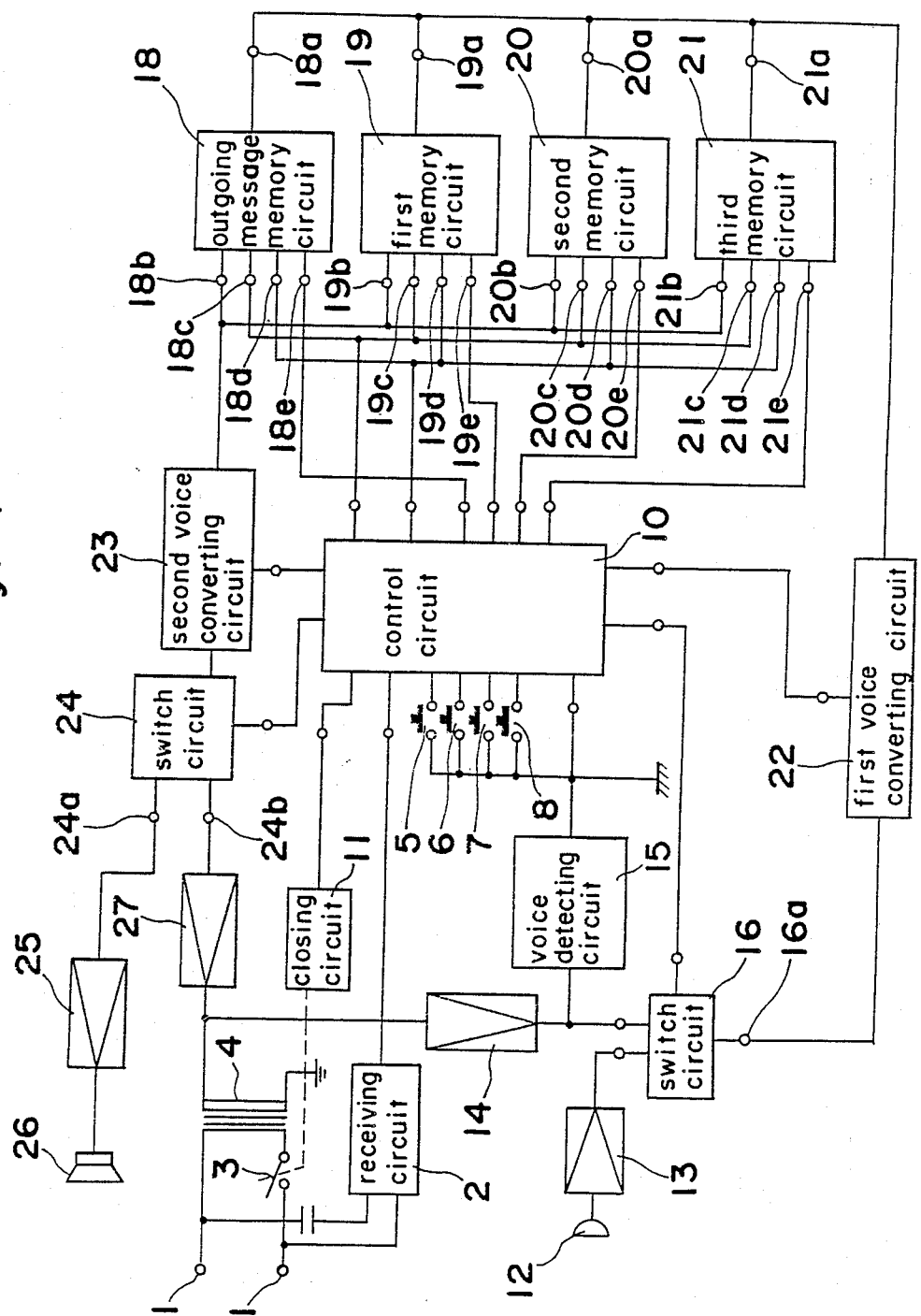
FIG. 1 is a block diagram showing a circuit construction of an automatic telephone answering apparatus according to a first embodiment of the present invention.

Before the description of the present invention proceeds, it is to be noted that like parts are designated by like reference numerals throughout the accompanying drawings.

Referring to FIG. 1, a circuit diagram of an automatic telephone answering apparatus according to a first embodiment of the present invention is illustrated therein in which reference numeral 1 designates a connection terminal to a telephone circuit; numeral 2 designates a receiving circuit which detects a call signal coming from the telephone circuit; numeral 3 designates a closing switch which closes the telephone circuit; and numeral 4 designates a line transformer. An automatic answering switch 5 brings the automatic telephone answering apparatus into an automatic answering mode. A switch 6 is for an outgoing message which is operated when the outgoing message is to be recorded, and a reproduction switch 7 is operated when the outgoing message or a message from a caller is reproduced. In order to erase a signal stored in a memory circuit, an erasure switch 8 is operated. A control circuit 10 works in correspondence to the operation of each switch, and at the same time, it controls each operation of the automatic telephone answering apparatus which will be described later. A closing circuit 11 is turned operable by a driving signal outputted from the control circuit 10 on the basis of a signal generated of the receiving circuit 2, with a function to control the closing and the opening of the closing switch 3. A numeral 12 designates a microphone which operates when the outgoing message is recorded. A signal obtained from the microphone 12 is inputted into and amplified by an amplification circuit 13 for the microphone 12. To a first amplification circuit 14 is inputted a voice from the caller through line transformer 4. The first amplification circuit 14 amplifies the voice from the caller. A voice detection circuit 15 is provided so as to detect the voice signal amplified by the first amplification circuit 14. Both an output signal from the microphone amplification circuit 13 and an output signal from the first amplification circuit 14 are added to a switch circuit 16 which is controlled by a signal from the control circuit 10 and is so arranged that when an outgoing message is recorded, the signal from the microphone amplification circuit 13 is outputted to an output terminal 16a of the switch circuit 16, and in the operation modes other than the aforementioned case, the voice of the caller which is a signal from the first amplification circuit 14 is outputted to the output terminal 16a. A memory circuit 18 for an outgoing message stores the outgoing message in digital signals, with a write-in terminal 18a, a read-out terminal 18b, a control terminal 18c for controlling the write-in operation and the read-out operation, an erasing terminal 18d for erasing stored signals, and a selecting terminal 18e which selects whether to operate the memory circuit 18.

First, second and third memory circuits 19, 20 and 21 in which the message from the caller is stored in the form of digital signals at every call are respectively provided with write-in terminals 19a, 20a and 21a, read-out terminals 19b, 20b and 21b, control terminals 19c, 20c and 21c for controlling for controlling the write-in operation and the read-out operation, erase terminals 19d, 20d, and 21d for erasing stored signals, and selection terminals 19e, 20e and 21e for selecting whether to operate the respective memory circuits.

A first voice converting circuit 22 converts a voice signal applied thereto from the output terminal 16a of the switch circuit 16 into a digital signal, an output terminal of which is connected to the write-in terminals 18a, 19a, 20a and 21a provided with the outgoing message memory circuit 18, the first memory circuit 19, the second memory circuit 20 and the third memory circuit 21, respectively. A second voice converting circuit 23 converts the digital signal read out from the memory circuits 18, 19, 20 and 21 into a voice signal.

Into a switch circuit 24 is inputted a signal converted into the voice signal by the second voice converting circuit 23. The operation of the switch circuit 24 is controlled by the signal from the control circuit 10, which is provided with a first output terminal 24a to which a signal is outputted when the signal memorized in each memory circuit is reproduced, and a second output terminal 24b to which a signal is outputted when the apparatus is in the automatic answering mode. An amplification circuit 25 for reproduction is inputted a signal outputted to the first output terminal 24a of the switch circuit 24, in which circuit 25 the signal is amplified. The amplified signal by the reproduction amplification circuit 25 is added to a speaker 26 which discharges the signal in sound. A second amplification circuit 27 amplifies a signal inputted thereto through the second output terminal 24b of the switch circuit 24, which is so connected as to send out its output signal to the caller through the line transformer 4. In the above-described construction, when the automatic telephone answering apparatus is put in the automatic answering mode through manipulation of the automatic answering switch 5, one memory circuit is used for one call so as to store the message from the caller. The storing time of the message is determined by the capacity of the memory circuit.

The operation of the automatic telephone answering apparatus having the above-described construction will be explained hereinbelow.

First of all, the storing operation of the outgoing message to be sent out to the caller will be described. When the outgoing message switch 6 is closed, a switching signal is inputted to the control circuit 10, resulting in the condition that the output signal of the microphone amplification circuit 13 is outputted to the output terminal 16a of the switch circuit 16. At the same time, the first voice converting circuit 22 is rendered operable. Moreover, a signal from the control circuit 10 is added both to the selection terminal 18e and the control terminal 18c of the outgoing message memory circuit 18, and accordingly, the outgoing message memory circuit 18 is brought into the operable condition ready for the write-in operation. In the above-described state, if the user speaks the outgoing message into the microphone 12, the voice converted into electric signals by the microphone are inputted and amplified in the microphone amplification circuit 13. Then, the voice signal thus amplified by the microphone amplification circuit 13 is added to the first voice converting circuit 22 through the switch circuit 16 to be converted into digital signals. The digitalized signals converted by the first voice converting circuit 22 are sent to the write-in terminal 18a of the outgoing message memory circuit 18 in condition for the write-in operation, such that the signals are stored in the outgoing message memory circuit 18. In the manner as above, the outgoing message is stored in the outgoing message memory circuit 18.

A further explanation will be given hereinbelow of the reproducing operation of the outgoing message for confirmation thereof.

The reproducing operation of the outgoing message is carried out by closing the outgoing message switch 6 and the reproduction switch 7. The closure of these switches 6 and 7 invites the condition that a signal is outputted to the first output terminal 24a of the switch circuit 24 and also the second voice converting circuit 23 is rendered operable. At the same time, a signal from the control circuit 10 is added to the selection terminal 18e and the control terminal 18c of the outgoing message memory circuit 18, whereby the circuit 18 is brought into the condition for the read-out operation. Consequently, the digital signal read out from the outgoing message memory circuit 18 is inputted to the second voice converting circuit 23 to be converted into a voice signal. Thereafter, the voice signal converted by the second voice converting circuit 23 is inputted, through the switch circuit 24, to the reproduction amplification circuit 25. After the voice signal is amplified in the reproduction amplification circuit 25, it is discharged in sound by the speaker 26. Accordingly, the user can reproduce and hear the outgoing message stored in the outgoing message memory circuit 18 so as to confirm the contents of the message.

The outgoing message is stored and reproduced in the manner as described above, and now the automatic answering operation will be explained hereinbelow.

When the automatic answering switch 5 is closed, the automatic answering apparatus of the present invention is brought into such state that the output signal generated by the first amplification circuit 14 is outputted to the output terminal 16a of the switch circuit 16, and simultaneously, the voice signal from the second voice converting circuit 23 is outputted to the second output terminal 24b of the switch circuit 24.

Under the above-described state, if the caller sends out a dialed address signal which causes a central office to send a ringing signal through the telephone circuit, the ringing signal is supplied to the incoming ringing receiving circuit 2 through the phone circuits 1 and 1. The ringing receiving circuit 2 detects the ringing signal and generates an output signal to the control circuit 10. When the control circuit 10 detects that a signal from the ringing receiving circuit 2 was added, the control circuit 10 generates a signal to the closing circuit 11, such that the closing circuit 11 is actuated to turn on the closing switch 3. Thus, the automatic telephone answering apparatus is rendered ready for a telephone call. At this time, the control circuit 10 generates a signal to the selection terminal 18e of the outgoing message memory circuit 18, and simultaneously, supplies a signal to the control terminal 18c so as to obtain the read-out operation mode. As a result, the outgoing message memory circuit 18 is brought into the read-out operation mode, thereby to read out the outgoing message stored in the form of digital signals from the read-out terminal 18b. The read-out outgoing message is converted to a voice signal by the second voice converting circuit 23 then in the operating mode, and amplified by the second amplification circuit 27 through the switch circuit 24. Thereafter, the voice signal is sent into the phone circuits 1 and 1 through the line transformer 4 to be transmitted to the caller. Upon completion of the reproduction of the outgoing message as described above, a beep tone is generated to be heard by the caller. At the same time, the beep tone is added to the control circuit 10, such that the operation signal which has been being added to the selection terminal 18e of the outgoing message memory circuit 18 is sent to the selection terminal 19e of the first memory circuit 19. Furthermore, the control circuit 10 outputs a signal for obtaining the write-in operation mode to the control terminal 19c, thereby bringing the first memory circuit 19 into the storing condition. Therefore, when the caller, upon hearing the beep tone, speaks out a message to be transmitted to the owner of the automatic telephone answering apparatus, the incoming message is sent to the line transformer 4 through the phone circuits 1 and 1. Then, the message is further supplied to the first amplification circuit 14 to be amplified. Thereafter, through the switch circuit 16, the amplified message is sent to the first voice converting circuit 22 which is driven by a signal from the control circuit 10. In the same manner as in the case of recording the answering message, the message, after it has been converted into digital signals by the first voice converting circuit 22, is added to the write-in terminal 19a of the first memory circuit 19 so as to be stored in the first memory circuit 19.

After the incoming message signal from one caller is stored in the first memory circuit 19 in the manner as described above, when a further ringing signal from the central office is received again, the ringing receiving circuit 2 detects the fact, operating the closing circuit 11 so as to close the closing switch 3. Accordingly, the automatic telephone answering apparatus is brought into the condition ready for conversation. Then, the outgoing message stored in the outgoing message memory circuit 18 is first read out and transmitted to the caller. After the outgoing message is completely read out, the operation signal from the control circuit 10 is supplied to the selection terminal 20e of the second memory circuit 20 since the first memory circuit 19 has already stored the incoming message. Accordingly, the second memory circuit 20 is brought in the storing condition and stores the incoming message from the caller. Thus, in the manner as above, the messages from the caller are stored one by one in each of the memory circuits.

In the meantime, even when the ringing signal is sent out by the central office, and the closing circuit 11 is driven to close the closing switch 3, the outgoing message the outgoing message memory circuit 18 is read out to be transmitted to the caller, and the automatic answering apparatus is brought into the storing condition for storing the incoming message from the caller, but the caller does not supply the message to the apparatus, a signal is added to one of the selection terminals 19e, 20e and 21e of the respective first, second and third memory circuits 19, 20 and 21 so as to obtain the storing condition. For example, supposing that the incoming message is already stored in the first memory circuit 19, the second memory circuit 20 is brought into the storing condition, after transmission of the outgoing message to the caller. In this case, however, even when the caller does not transmit the message, the second memory circuit is dealt with as if the message were stored therein. Therefore, after a next call signal from the caller is received and the outgoing message is transmitted to the caller, the third memory circuit 21 is driven to store the message from the caller. Thus, actually the second memory circuit is not utilized at all. The memory circuits in the automatic telephone answering apparatus which are small in number cannot be fully utilized, and the outgoing message can hardly be stored.

Noting the above fact, the automatic telephone answering apparatus according to the first embodiment of the present invention is so arranged that the presence or absence of the incoming message signal which is sent out by the caller within a time during which the second memory circuit 20 is able to store the message, added to the line transformer 4 through the phone circuits 1 and 1, and amplified by the first amplification circuit 14 after the automatic answering apparatus is turned into the storing condition for storing the incoming message from the caller is detected by the voice detected circuit 15. If the incoming message is not detected within the aforementioned time, then the caller has failed to communicate. Therefore, the control circuit 10 is controlled to add a signal to the erasing terminal 20d of the second memory circuit 20 in the storing condition, such that the memory in the second memory 20 is erased, since up to this time, the second memory circuit was only storing silence in memory due to the absence of any incoming message communicated by the caller. Accordingly, the second memory circuit 20 is returned to the condition where no message is stored, and therefore, after a next outgoing message is transmitted, the second memory circuit 20 is prepared again for storing the incoming message from the caller. Thus, the present invention can make good use of all the memory circuits.

In order to read out the incoming messages stored in the first, the second and the third memory circuits during the owner's absence, the automatic answering switch 5 and the reproduction switch 7 should be turned on. Consequently, the second voice converting circuit 23 is actuated by the control circuit 10, with the switch circuit 24 being switched to the side of the output terminal 24a. Moreover, the operation signal from the control circuit 10 is added to the selection terminal 19e of the first memory circuit 19. At the same time, the read-out signal is supplied to the control terminals 19c, 20c and 21c of the first, second and third memory circuits 19, 20 and 21. As a result of this, the digital signal of the incoming message stored in the first memory circuit 19 is read out first from the read-out terminal 19b, and converted into the voice signal by the second voice converting circuit 23. Then, the converted voice signal is switched in the switch circuit 24 to be amplified by the speaker amplification circuit 24a, and finally it is sounded out through the speaker 26.

After the read-out time for the first memory circuit 19 has passed, the operation signal is then added to the selection terminal 20e of the second memory circuit 20, whereby the incoming message stored by the second memory circuit 20 is read out in the same manner as above.

Thus, the incoming messages stored in the memory circuits can be read out sequentially one after another.

As has been described above, according to the first embodiment of the present invention, when the incoming message from the caller is to be stored in the message memory circuit, it is detected within a predetermined time after the message memory circuit is brought into the storing condition whether or not the voice signal from the caller is present. Since it is so arranged that the incoming message memory circuit in the storing condition is erased without any voice signal detected, the next incoming message from the caller can be stored in the incoming message memory circuit. Therefore, in the case where a plurality of incoming message memory circuits are provided each for one call, is that every incoming message is stored in the incoming message memory circuits one after another, it is possible according to the present invention that the incoming message memory circuits are utilized in full scale without any waste.

Figure 2:
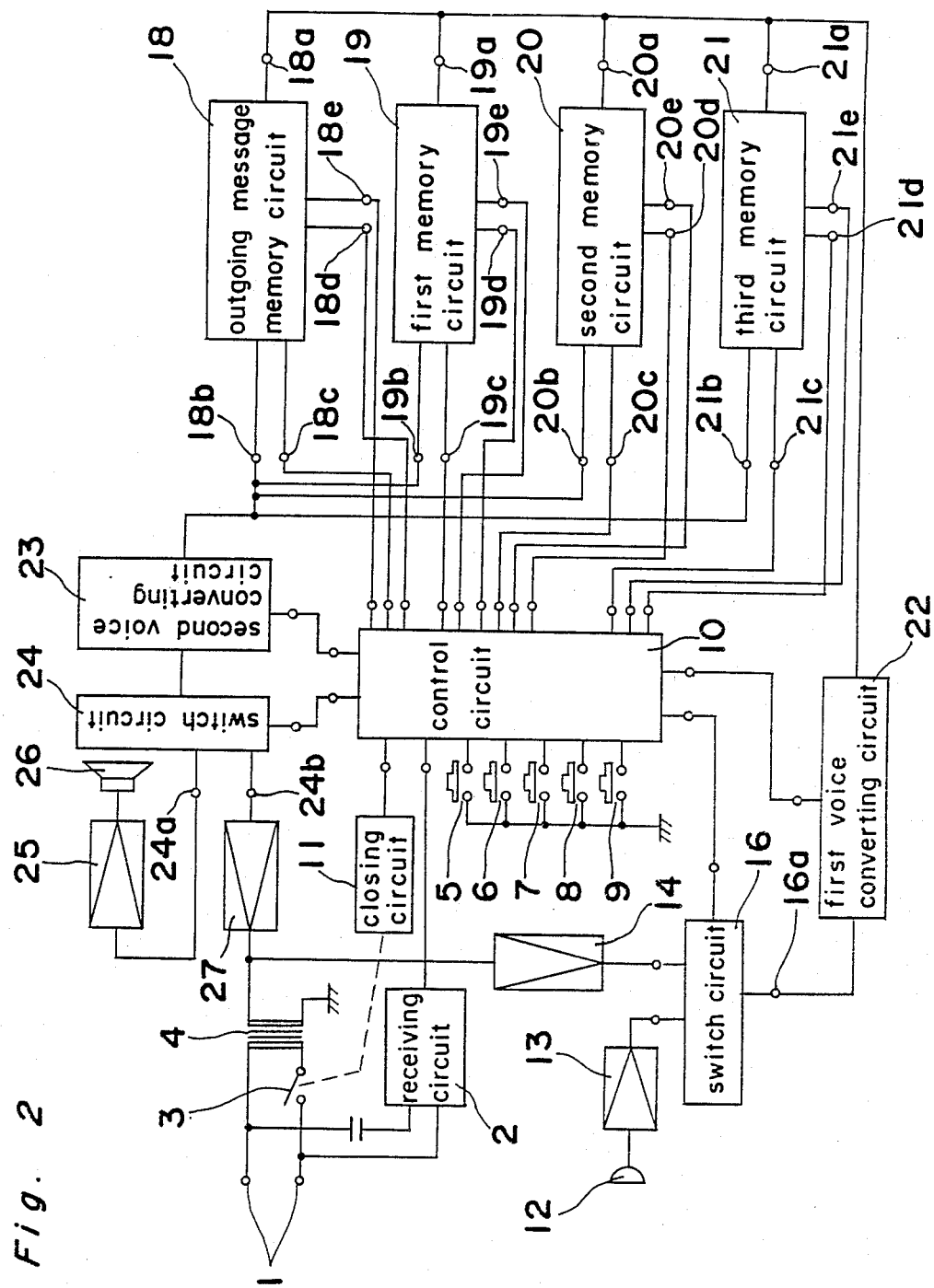
FIG. 2 is a block diagram showing a circuit construction of an automatic telephone answering apparatus according to a second embodiment of the present invention.

Referring to FIG. 2, there is shown a circuit diagram of an automatic telephone answering apparatus according to a second embodiment of the present invention. The circuit construction of the automatic telephone answering apparatus of FIG. 2 is generally the same as that of the first embodiment, and therefore, like parts are designated by like reference numerals, the description of which will be abbreviated for brevity.

As compared with the automatic telephone answering apparatus of the first embodiment, the apparatus according to the second embodiment is different in that the voice detection circuit 15 is omitted, while a switch 9 which is operated when the call is desired to be recorded is added. It is so constructed that when the apparatus is in the call recording mode, the manipulation of the call recording switch 9 forms a memory circuit by the first, second and third memory circuits 19, 20 and 21 which are used one by one in succession. Although the messages stored in the first, second and third memory circuits 19, 20 and 21 are reproduced through manipulation of the reproduction switch 7, the memory circuit from which the message is read out is sequentially switched to one after another every time the reproduction switch 7 is closed.

The automatic telephone answering apparatus of the second embodiment of the present invention having the above-described construction operates as follows.

In the automatic telephone answering apparatus of the present embodiment, although the outgoing message is stored and reproduced in the same manner as in the apparatus of the first embodiment, also the automatic answering operation which will be described hereinbelow is carried out similarly.

When the automatic answering switch 5 is closed, the output signal from the first amplification circuit 14 is outputted to the output terminal 16a of the switch circuit 16, and at the same time, the voice signal from the second voice converting circuit 23 is outputted to the second output terminal 24b of the switch circuit 24. Under the above-described condition, if the ringing signal is received from the phone circuit, the ringing receiving circuit 2 to which the ringing signal is inputted is driven to generate an output signal to the control circuit 10. Then, the control circuit 10 outputs a signal for driving both the closing circuit 11 and the second voice converting circuit 23. Simultaneously, a signal for bringing the outgoing message memory circuit 18 into the read-out operation condition is generated from the control circuit 10. Then, the control circuit 10 outputs a signal for driving both the closing circuit 11 and the second voice converting circuit 23. Simultaneously, a signal for bringing the outgoing message memory circuit 18 into the read-out operation condition is generated from the control circuit 10. When the closing circuit 11 becomes operable, the closing switch 3 is closed, thereby to close the phone circuit. Upon closing of the phone circuit as described above, the outgoing message stored in the outgoing message memory circuit 18 in the form of digital signals is read out and inputted to the second voice converting circuit 23 in which the outgoing message is converted into voice signals. The outgoing message converted into the voice signals by the second voice converting circuit 23 is, through the switch circuit 24, inputted to the second amplification circuit 27. After the outgoing message in voice signals is amplified by the second amplification circuit 27, it is sent out to the caller through the line transformer 4. When the outgoing message is completely sent out, the apparatus is switched by the control circuit 10 into the condition for storing the message from the caller. Because of the switching operation as above, both the second voice converting circuit 23 and the outgoing message memory circuit 18 are rendered inoperable, and at the same time, the first voice converting circuit 22 is turned operable. Furthermore, the first memory circuit 19 which is provided so as to store the message from the caller is changed into the write-in operation mode.

In the above-described state, the message from the caller is amplified by the first amplification circuit 14 through the line transformer 4, and thereafter, is inputted into the first voice converting circuit 22 through the switch circuit 16. After the message from the caller is converted into digital signals by the first voice converting circuit 22, it is added to the write-in terminal 19a of the first memory circuit 19 which is in the write-in operation mode, so as to be recorded by the first memory circuit 19. When the predetermined time, that is, the time which is set with consideration into the capacity of the first memory circuit 19 has passed while the message from the caller has been recorded, the closing operation by the closing circuit 11 is released, such that the automatic answering apparatus is returned into the automatic answering mode. Thus, after the automatic answering operation, in other words, the outgoing message is sent out to the caller, the message from the caller is stored in the first memory circuit 19 in the above described manner. A message from the caller directed to the next incoming call is stored by the second memory circuit 20, and a message from the caller directed to a further next incoming call is stored by the third memory circuit 21.

It may be so arranged that when the messages from the caller are stored in all of the memory circuits, the control circuit 10 controls not to operate the closing circuit 11 even when a call signal is received, or in the case of an apparatus which has a function to catch the message from the caller stored in the memory circuit from a remote place, it may be possible change the time before the closing operation to be longer than the usual operation.

The message stored in the above-described manner is reproduced in the following manner.

The reproduction for hearing the stored message is carried out by closing the reproduction switch 7. By closing the reproduction switch 7, the first output terminal 24a of the switch circuit 24 becomes waiting for a signal to be outputted thereinto. At the same time, the second voice converting circuit 23 is rendered operable. Moreover, the first memory circuit 19 is brought into the read-out operation condition and, accordingly, the message from the caller stored in the first memory circuit 19 in digital signals are read-out from the first memory circuit 19 into the second voice converting circuit 23. The digital signals of the message from the caller are converted into voice signals by the second voice converting circuit 23, which are in turn inputted to the reproduction amplification circuit 25 through the switch circuit 24. The message is, after having been amplified by the reproduction amplification circuit 25, sent to the speaker 26 to be amplified, and therefore the user is able to hear the message from the caller. If the reproduction switch 7 is closed again after the message stored in the first memory circuit 19 is reproduced for hearing, the first memory circuit 19 is brought in the non-operable condition by the control circuit 10. At the same time, the second memory circuit 20 is brought into the read-out operation condition, and the message stored in the second memory circuit 20 is discharged in sound by the speaker 26. Therefore, the user can hear the message. Further, if the reproduction switch 7 is closed again, the second memory circuit 20 is turned in the non-operable condition, while the third memory circuit 21 is turned into the condition for the read-out operation. Accordingly, the message stored in the third memory circuit 21 is amplified through the speaker 26 to be heard by the user. Then, by closing the reproduction switch 7 again, the third memory circuit 21 is turned into the non-operable condition, while the first memory circuit 19 is turned into the condition, while the first memory circuit 19 is turned into the condition for the read-out operation. As is described above, every time the reproduction switch 7 is closed, the memory circuit which is brought into the condition for the read-out operation is switched one after another, such that the message stored in each memory circuit can be reproduced. If the reproduction switch 7 is closed while the message stored in each of the memory circuits is being reproduced, the message stored in the succeeding memory circuit is reproduced immediately. Therefore, the apparatus according to the present embodiment is considerably convenient when the message from a specific caller is desired to be reproduced.

The message stored in each of the memory circuits is erased in the manner as will be described below.

The message is erased by closing the erasure switch 8 while it is being reproduced. For example, while the message stored in the first memory circuit 19 is reproduced, the closure of the erasure switch 8 makes the control circuit 10 generate a signal to the erasure terminal 19d provided with the first memory circuit 19 so as to erase the message. In consequence, the message in the first memory circuit 19 is erased. The erasing operation with respect to the first memory circuit 19 is thus conducted. Since the erasing operation with respect to the second and the third memory circuits is similarly carried out, the explanation thereof will be abbreviated here.

It will be described hereinbelow how the call, namely, the voice of the caller is recorded during the conversation between the user and the caller.

In order to record the voice of the caller, a call recording switch 9 should be turned on during the conversation. When the call recording switch 9 is closed, the control circuit 10 is operated. As a result, the switch circuit 16 comes to output a signal from the first amplification circuit 14. Simultaneously, the first voice converting circuit 22 is brought into the operable condition. Moreover, the first, the second and the third memory circuits 19, 20 and 21 are prepared to store the message from the caller continuously. The voice from the caller is inputted through the line transformer 4 to the first amplification circuit 14. After the voice is amplified in the first amplification circuit 14, the voice is added to the first voice converting circuit 22 to be converted in digital signals. The voice signal converted into digital signals by the first voice converting circuit 22 is added to the write-in terminals 19a, 20a and 21a of the respective first, second and third memory circuits. Then, the storing operation is started by the control circuit 10 from the first memory circuit 19. When the first memory circuit 19 stores the message up to its capacity, the second memory circuit 20 becomes operable, and the sequel to the voice stored in the first memory circuit 19 is stored in the second memory circuit 20. Moreover, when the second memory circuit 20 is filled with the message to capacity, the third memory circuit 21 is turned into the operating condition, such that the sequel to the voice stored by the second memory circuit is stored by the third memory circuit 21. As is made clear from the above description, since the first, the second and the third memory circuits 19, 20 and 21 are arranged to be continuously used as a memory circuit, the long-time storing operation can be realized.

The message thus stored in the above manner is reproduced as follows.

If the reproduction switch 7 is closed after the call is recorded, the first output terminal 24a of the switch circuit 24 is in the condition to be inputted a signal, and at the same time the second voice converting circuit 23 is brought in the operating condition. When the apparatus is in the reproducing mode, the messages stored in the first, the second and the third memory circuits 19, 20 and 21 are read out successively, and the user can reproduce and hear the contents of the messages from the caller which has been stored during the call, through the sounding operation by the speaker 26.

The operation of the apparatus set in the automatic answering mode by the automatic answering switch 5 with erasing of the messages stored in the first, the second and the third memory circuits 19, 20 and 21 through the call recording operation will be described hereinbelow.

When the apparatus is set in the automatic answering mode through manipulation of the automatic answering switch 5, the output signal from the first amplification circuit 14 comes to be outputted to the output terminal 16a of the switch circuit 16. Concurrently with this, the voice signal from the second voice converting circuit 23 comes to be outputted to the second output terminal 24b of the switch circuit 24. In the state as described above, when the call signal is received through the phone circuit, the apparatus is disconnected from the phone circuit because of the operation of the receiving circuit 2, the control circuit 10 and the closing circuit 11. However, when the disconnection of the apparatus from the phone circuit is done, the control circuit 10 generates a signal to the erasure terminals 19d, 20d and 21d provided in the first, second and third memory circuits 19, 20 and 21, respectively, such that the messages stored in the first, second and third memory circuits 19, 20 and 21 are erased. Accordingly, the message from the caller is able to be stored in each of the memory circuits 19, 20 and 21, thereby to effect the above-described automatic answering operation.

Although three memory circuits are assigned for storing the messages from the caller in digital signals in the apparatus of the second embodiment of the present invention, the number of the memory circuits is not limited to three.

According to the present embodiment, since it is so arranged that a plurality of incoming message memory circuits each provided for every one call for storing the message from the caller in digital signals are employed successively in the call recording mode, resulting in realization of the storing operation for a long time, the apparatus is useful in the case where the capacity of a semiconductor element employed as the memory circuit is small. Further, even when the apparatus is set in the automatic answering mode without erasing the message stored in each memory circuit is subjected to the erasing operation when the call is received, and therefore the message from the caller is able to be stored. Accordingly, the automatic telephone answering apparatus of the present embodiment is advantageously convenient in that the message can be stored as long as possible.

Figure 3:
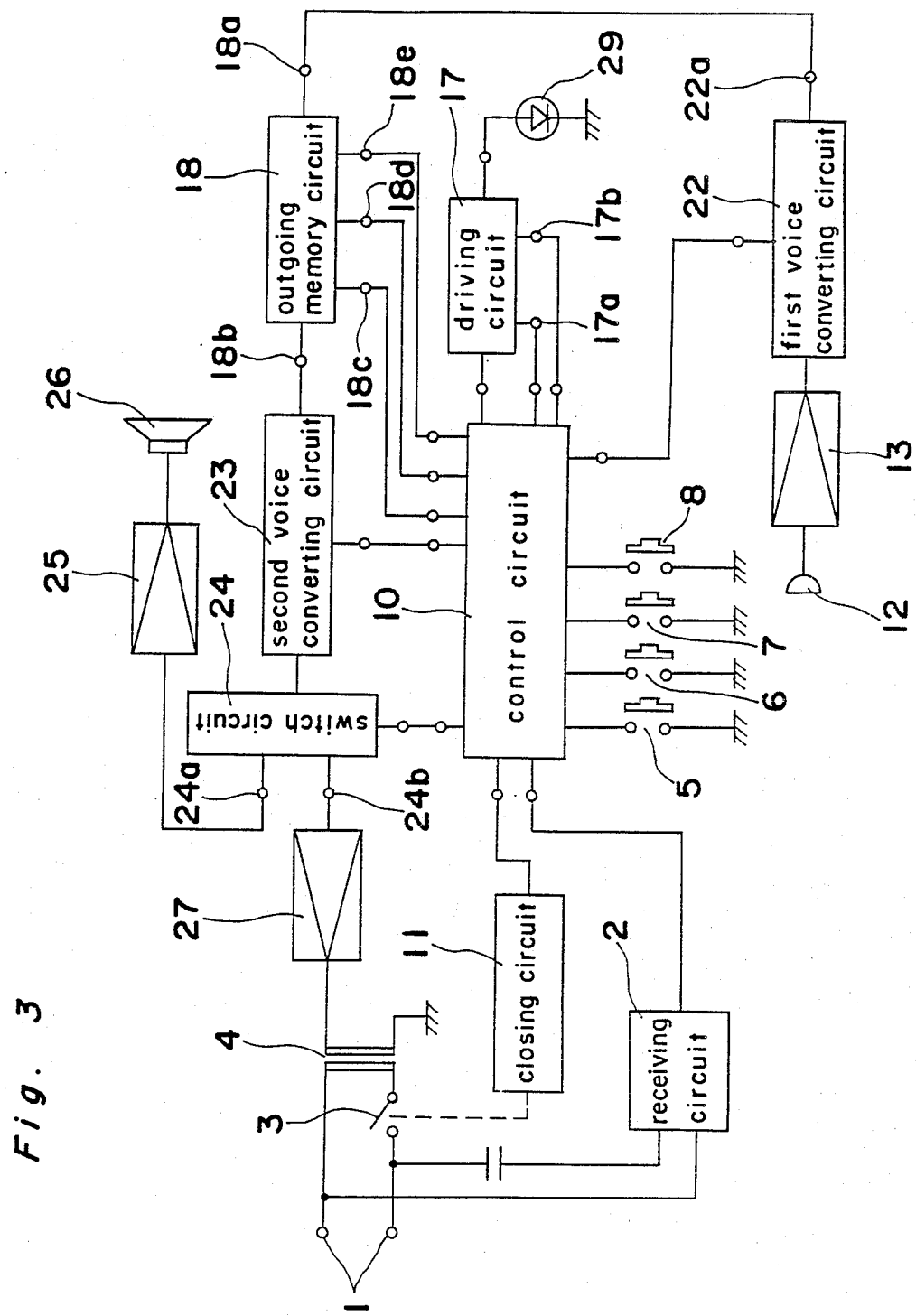
FIG. 3 is a block diagram showing a circuit construction of a display circuit in an automatic telephone answering apparatus according to a third embodiment of the present invention.

A circuit diagram of an automatic telephone answering apparatus according to a third embodiment of the present invention is shown in FIG. 3, wherein numeral 1 designates a connection terminal to a phone circuit; numeral 2 designates a call receiving circuit which detects a call signal from the phone circuit; numeral 3 designates a closing switch which closes the phone circuit; and numeral 4 designates a line transformer. An automatic answering switch 5 sets the apparatus in the automatic answering mode. Switches 6, 7 and 8 are turned on and off when an outgoing message is to be stored, when an outgoing message is to be reproduced, and when a signal stored in the memory circuit is to be erased, respectively. The control circuit 10 is operated in correspondence with the operation of each of the above switches 6, 7 and 8, and at the same time the control circuit 10 controls each operation of the automatic answering apparatus. A driving signal which is generated from the control circuit 10 on the basis of the signal from the receiving circuit 2 puts a closing circuit 11 into an operating condition. The closing circuit 11 acts to control the closing or opening of the closing switch 3. The microphone 12 is operated in the storing mode of the outgoing message. Moreover, the microphone amplification circuit 13 is provided so as to amplify a signal obtained from the microphone 12. The outgoing message is stored in the outgoing message memory circuit 18 in digital signals, which is provided with the write-in terminal 18a, the read-out terminal 18b, the control terminal 18c which controls the write-in operation and the read-out operation, the erasure terminal 18d which erases a stored signal and the selection terminal 18e which makes selection as to the operation or the non-operation of the outgoing message memory circuit 18. A microphone signal amplified by the microphone amplification circuit 13 is added to the first voice converting circuit 22 which in turn converts the signal into digital signals. The output terminal 22a of the first voice converting circuit 22 is connected to the write-in terminal 18a of the outgoing message memory circuit 18. The digital signals read out from the outgoing message memory circuit 18 is inputted into the second voice converting circuit 23 so as to be converted into voice signals by the circuit 23. The switch circuit 24 is controlled by a signal from the control circuit 10, and at the same time a signal converted into voice signal by the second voice converting circuit 23 is inputted thereinto. The switch circuit 24 is provided with the first output terminal 24a into which a signal is outputted when the signal stored in the outgoing message circuit 18 is reproduced for hearing, and the second output terminal 24b into which a signal is outputted in the automatic answering mode. Into the reproduction amplification circuit 25, there is inputted and amplified a signal outputted to the first output terminal 24a of the switch circuit 24. The signal amplified by the reproduction amplification circuit 25 is added to the speaker 26 through which the signal is sounded. The signal outputted to the second output terminal 24b is inputted to be amplified in the amplification circuit 27 which has its output signal connected in such manner as to be sent to the caller through the line transformer 4. When the outgoing message memory circuit 18 is brought into the write-in operation condition as the recording switch 6 is closed, the driving circuit 17 is turned into the operating condition, thereby to turn on and off a light emitting diode 29 by a first cycle. The driving circuit 17 is so constructed that, when the storable capacity of the outgoing message memory circuit 18 reaches a given value, the signal from the control circuit 10 is added to a first switching terminal 17a and the light emitting diode 29 is turned on and off by a second cycle which is faster than the first cycle. Then, if the storable capacity of the outgoing message memory circuit 18 is exhausted, the signal from the control circuit 10 is added to a second switching terminal 17b of the driving circuit 17, so that the light emitting diode 29 is kept being turned on. The display circuit of the automatic telephone answering apparatus according to the third embodiment of the present invention has such construction as described above, and it will be operated as follows.

First, the storing operation of the outgoing message to be sent out to the caller will be explained.

By closing the recording switch 6, a switching signal is inputted to the control circuit 10. In consequence, the microphone 12 and the microphone amplification circuit 13 are turned into the operable condition. Moreover, the first voice converting circuit 22 is also brought into the operable condition. At the same time, the signal from the control circuit 10 is added to the control terminal 18c and the selection terminal 18e in the outgoing message memory circuit 18, so that the outgoing message memory circuit 18 is prepared for the write-in operation. At this time when the outgoing message memory circuit 18 is in the write-in operation condition, the driving circuit 17 is brought into the operable condition by the signal from the control circuit 10. Accordingly, the light emitting diode 29 is turned on and off by the first cycle. Thus, the user is able to recognize that the outgoing message memory circuit 18 is rendered in the write-in operation condition. In the above-described condition, if the user speaks the outgoing message to the microphone 12, the signal converted in an electric signal by the microphone 12 is inputted to the microphone amplification circuit 13 to be amplified. Then, the voice signal amplified by the microphone amplification circuit 13 is added to the first voice converting circuit 22 which is in the operable condition, so that the voice signal is converted into a digital signal. The converted digital signal is sent to the write-in terminal 18a of the outgoing message memory circuit 18 in the write-in operation condition, and stored in the outgoing message memory circuit 18. Thus, the outgoing message is stored in the outgoing message memory circuit 18 in the manner as above. However, when the storable capacity of the outgoing message memory circuit 18 is reduced to a predetermined value in the storing operation, the control circuit 10 adds a switching signal to the first switching terminal 17a of the driving circuit 17. As a result of this, the turning-on and -off cycle of the light emitting diode 29 is made faster. Therefore, the user can recognize from the change of the turning-on and -off cycle of the light emitting diode 29 the fact that the storable capacity of the outgoing message memory circuit 18 is decreased. When the storable capacity of the outgoing message memory circuit 18 is exhausted, the switching signal is generated from the control circuit 10 to the second switching terminal 17b of the driving circuit 17, with switching the light emitting diode 29 from the condition where it is turned on and off to the condition where it is turned on. Therefore, the user can notice the exhaustion of the storable capacity of the outgoing message memory circuit 18, and also the user can recognize that the outgoing message has been stored.

Although the outgoing message is stored in the outgoing message memory circuit 18 in the manner as above, the erasure and the reproduction thereof are performed in the same manner as in the second embodiment, and therefore the description thereof will be abbreviated here.

In the foregoing embodiment, the display circuit is applied to a device exclusively used for answering which has therefore such function only as to send out the outgoing message to the caller. However, it is needless to say that the present invention can be embodied by an answer recording apparatus which can memorize or record the message from the caller in a memory circuit or on a magnetic tape. Further, although it is so arranged in the third embodiment of the present invention that the light emitting diode 29 is turned on and off by the first cycle when the outgoing message memory circuit 18 is put into the write-in operation condition, and the light emitting diode 29 is turned on and off by the second cycle which is faster than the first cycle when the outgoing message memory circuit 18 has little storable capacity, it may be possible that the cycle of the turning-on and -off of the light emitting diode 29 be changed to a slower one. Moreover, it is also possible that the light emitting diode 29 is kept lighted when the outgoing message memory circuit 18 is brought in the write-in operation condition, while the light emitting diode 29 is turned on and off when the storable capacity of the outgoing message memory circuit 18 is decreased. In addition, the light emitting diode is employed as a light emitting element in the third embodiment, but, other light emitting elements can be naturally employed.

In the display circuit according to the third embodiment of the present invention, when the storable capacity of the message memory circuit is decreased, it can be indicated by the change of the display condition of the light emitting element which is provided in order to indicate that the message memory circuit in which the outgoing message is recorded in digital signals is in the condition for the write-in operation. Accordingly, in the case where the outgoing message is to be stored, the storing time of the message is easy to be recognized. Therefore, if the display circuit is applied in an automatic telephone answering system using such memory circuits that have limited storing operation time for the outgoing messages, it displays considerably a great effect.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automatic telephone answering apparatus for use in the absence of a receiver, comprising, in combination,
   a first voice converting circuit for converting an analog voice input signal into a digital signal,
   an outgoing message memory circuit for receiving and storing a digital signal of an outgoing message converted by the first voice converting circuit,
   an incoming message circuit for receiving and storing a digital signal of an incoming message converted by said first voice converting circuit when receiving an incoming message,
   a second voice converting circuit for receiving and converting the digital signals stored in the outgoing message memory circuit and the incoming message memory circuit into analog voice signals,
   a ringing receiving means for detecting a ringing signal coming from a telephone line, said ringing receiving means producing a detection signal,
   switch means including a plurality of switches for selecting respective operation modes such as recording, reproducing and erasing, and
   a control circuit for controlling operations of the first voice converting circuit, the second voice converting circuit, the outgoing message memory circuit and the incoming message memory circuit upon receiving the detection signal of the ringing receiving means in accordance with the operation modes selected with the switch means,
   said switch means including a call recording switch operating so that as a call operation is going on through the telephone line, a plurality of incoming message memory circuits are brought into a state of being ready for use in succession so as to enable a call recording for a long time.

2. An automatic telephone answering apparatus for use in the absence of a receiver, comprising, in combination,
   a first voice converting circuit for converting an analog voice input signal into a digital signal,
   an outgoing message memory circuit for receiving and storing a digital signal of an outgoing message converted by the first voice converting circuit,
   an incoming message memory circuit for receiving and storing a digital signal of an incoming message converted by said first voice converting circuit when receiving an incoming message,
   a second voice converting circuit for receiving and converting the digital signals stored in the outgoing message memory circuit and the incoming message memory circuit into analog voice signals,
   a ringing receiving means for detecting a ringing signal coming from a telephone line, said ringing receiving means producing a detection signal,
   switch means including a plurality of switches for selecting respective operation modes such as recording, reproducing and erasing, and
   a control circuit for controlling operations of the first voice converting circuit, the second voice converting circuit, the outgoing message memory circuit and the incoming message memory circuit upon receiving the detection signal of the ringing receiving means in accordance with the operation of modes selected by the switch means,
   said switch means including a call recording switch and an automatic answering switch so that when a voice signal of a call is stored as the digital signal in the incoming message memory circuit by operation of the call recording switch in the case of a call operation going on through the telephone line, erasure terminals of the incoming message memory circuit erase the voice signal of the call stored in the incoming message memory circuit upon detection of the ringing signal of the ringing receiving means by said control circuit after the automatic answering switch is operated to effect a state for automatic answering.

3. An automatic telephone answering apparatus for use in the absence of a receiver, comprising, in combination,
   a first voice converting circuit for converting an analog voice input signal into a digital signal,
   an outgoing message memory circuit for receiving and storing a digital signal of an outgoing message converted by the first voice converting circuit,
   an incoming message memory circuit for receiving and storing a digital signal of an incoming message converted by said first voice converting circuit when receiving an incoming message,
   a second voice converting circuit for receiving and converting the digital signals stored in the outgoing message circuit and the incoming message memory circuit into analog voice signals,
   a ringing receiving means for detecting a ringing signal coming from a telephone line, said ringing receiving means producing a detection signal,
   switch means including a plurality of switches for selecting respective operation modes such as recording, reproducing and erasing, and
   a control circuit for controlling operations of the first voice converting circuit, the second voice converting circuit, the outgoing message memory circuit and the incoming message memory circuit upon receiving the detection signal of the ringing receiving means in accordance with the operation modes selected by the switch means, and,
   said switch means including a reproducing switch, said incoming message memory circuit reading-out the incoming message in response to an operation of the reproducing switch and sequentially changing the incoming message to be read-out in response to successive operations of the reproducing switch.

4. An automatic telephone answering apparatus for use in the absence of a receiver, comprising, in combination,
   a first voice converting circuit for converting an analog voice input signal into a digital signal,
   an outgoing message memory circuit for receiving and storing a digital signal of an outgoing message converted by the first voice converting circuit,
   an incoming message memory circuit for receiving and storing a digital signal of an incoming message converted by said first voice converting circuit when receiving an incoming message,
   a second voice converting circuit for receiving and converting the digital signals stored in the outgoing message memory circuit and the incoming message memory circuit into analog voice signals,
   a ringing receiving means for detecting a ringing signal coming from a telephone line, said ringing receiving means producing a detection signal,
   switch means including a plurality of switches for selecting respective operation modes such as recording, reproducing, and erasing, a control circuit for controlling operations of the first voice converting circuit, the second voice converting circuit, the outgoing message memory circuit and the incoming message memory circuit upon receiving the detection signal of the ringing receiving means in accordance with the operation modes selected by the switch means, and a voice detecting circuit for detecting an analog voice signal of the incoming message being transmitted by a caller through the telephone line, said switch means including an automatic answering switch so that when a state of automatic answering is set in response to an operation of the automatic answering switch, the outgoing message is sent out to the caller upon receiving the ringing signal from the caller, and, thereafter, memory contents of the incoming message memory circuit are erased in response to the voice detecting circuit detecting no message of the caller after the incoming message memory circuit enters into a state for storing a message from the caller.

5. An automatic telephone answering apparatus for use in the absence of a receiver, comprising, in combination, a first voice converting circuit for converting an analog voice input signal into a digital signal, an outgoing message memory circuit for receiving and storing a digital signal of an outgoing message is converted by the first voice converting circuit, an incoming message memory circuit for receiving and storing a digital signal of an incoming message converted by said first voice converting circuit when receiving an incoming message, a second voice converting circuit for receiving and converting the digital signals stored in the outgoing message memory circuit and the incoming message memory circuit into analog voice signals, a ringing receiving means for detecting a ringing signal coming from a telephone line, said ringing receiving means producing a detection signal, switch means including a plurality of switches for selecting respective operation modes such as recording, reproducing and erasing, a control circuit for controlling operations of the first voice converting circuit, the second voice converting circuit, the outgoing message memory circuit and the incoming message memory circuit upon receiving the detection signal of the ringing receiving means in accordance with the operation modes selected by the switch means, and a light emitting element to effect an indication operation when the outgoing message memory circuit is in a state for writing-in, said switch means including an outgoing message memory switch so that when the outgoing message memory circuit is rendered in a state for being able to store an outgoing message by an operation of the outgoing message memory switch, the light emitting element effects an indication operation which varies in response to a decrease in remaining capacity for storing in the outgoing message memory circuit.

6. An automatic telephone answering apparatus according to claim 4, further comprising:

means for erasing the incoming message memory circuit after a predetermined period of silence has elapsed so that said incoming message memory circuit is free for use to store a next message when received to make effective use of said incoming message memory circuit.

7. The apparatus as defined in claim 3; and further comprising:

means for detecting an absence of said voice signal within a predetermined period, said erasing means being responsive to a detection of the absence of said voice signal by said detecting means.

8. The apparatus as defined in claim 3; further comprising:

a plurality of incoming message memory circuits; and means for storing every incoming message one after the other in said plurality of incoming message memory circuits so that said message memory circuits are fully utilizable without waste of storage.

9. The apparatus as defined in claim 8; further comprising:

switch means for recording the incoming messages in said plurality of incoming message memory circuits successively;

means for reproducing the incoming messages; and means for reading out the incoming messages sequentially from said plurality of incoming message memory circuits in response to said reproducing means.

* * * * *